Nov. 4, 1941.    A. CLAUD-MANTLE    2,261,395
ASSIST CORD ASSEMBLY
Filed March 27, 1939    3 Sheets-Sheet 1
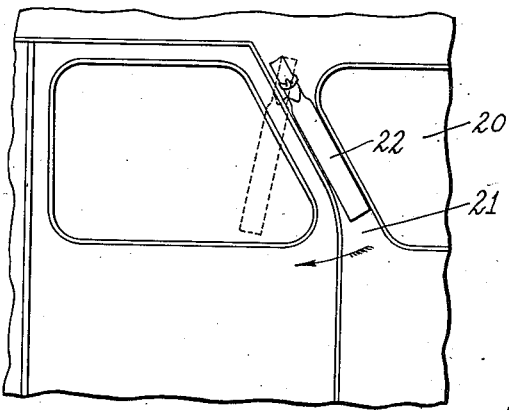
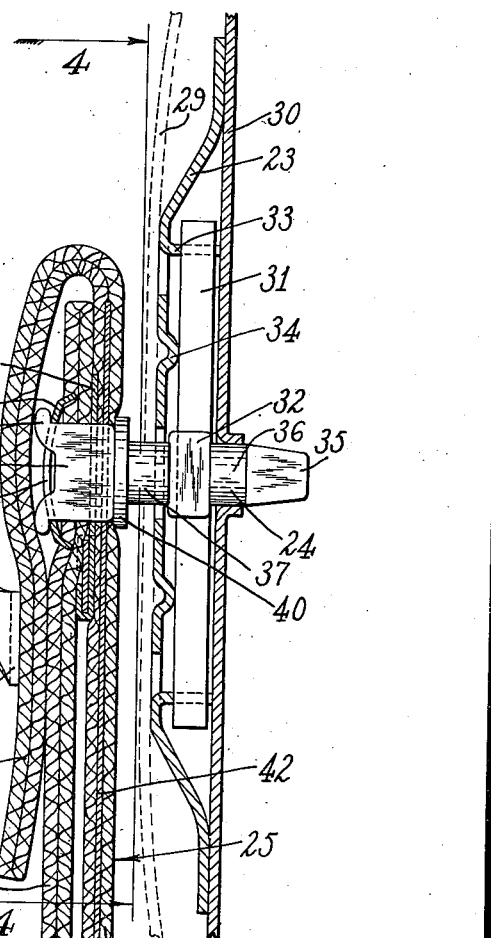
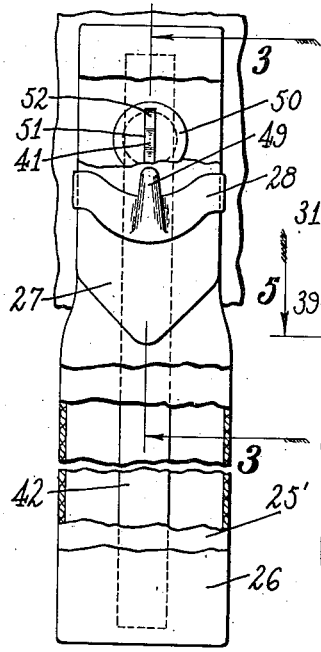
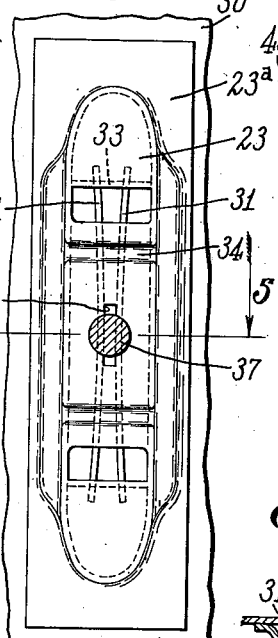
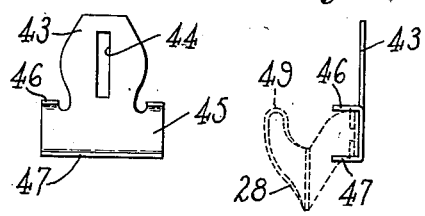
Inventor
Arthur Claud-Mantle
By Rockwell Bartholow
Attorneys

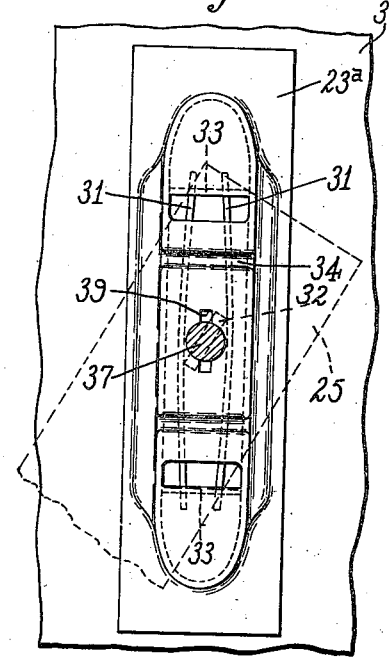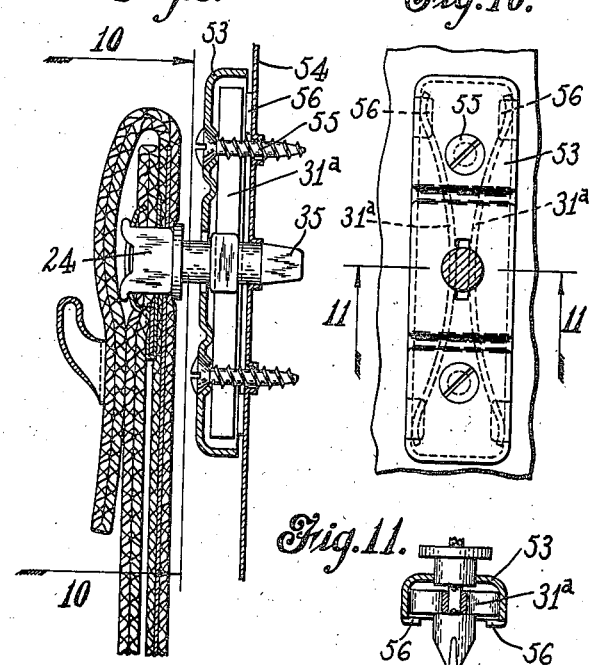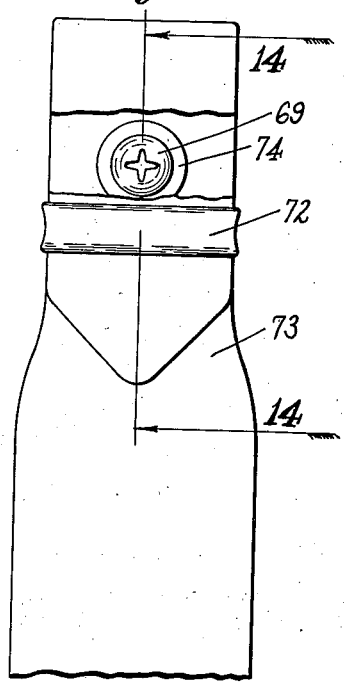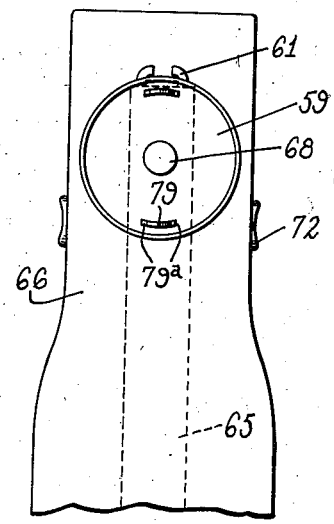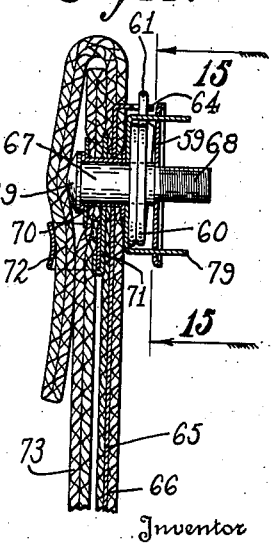

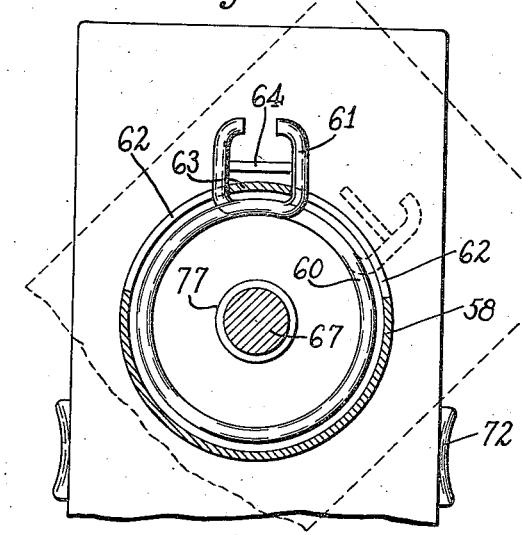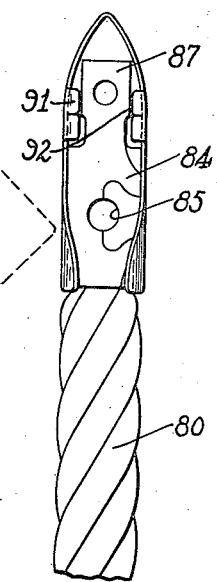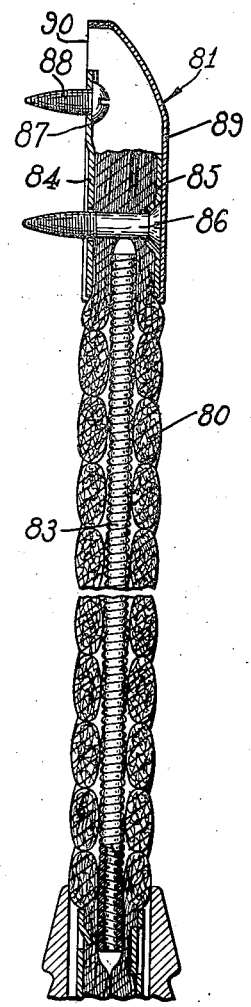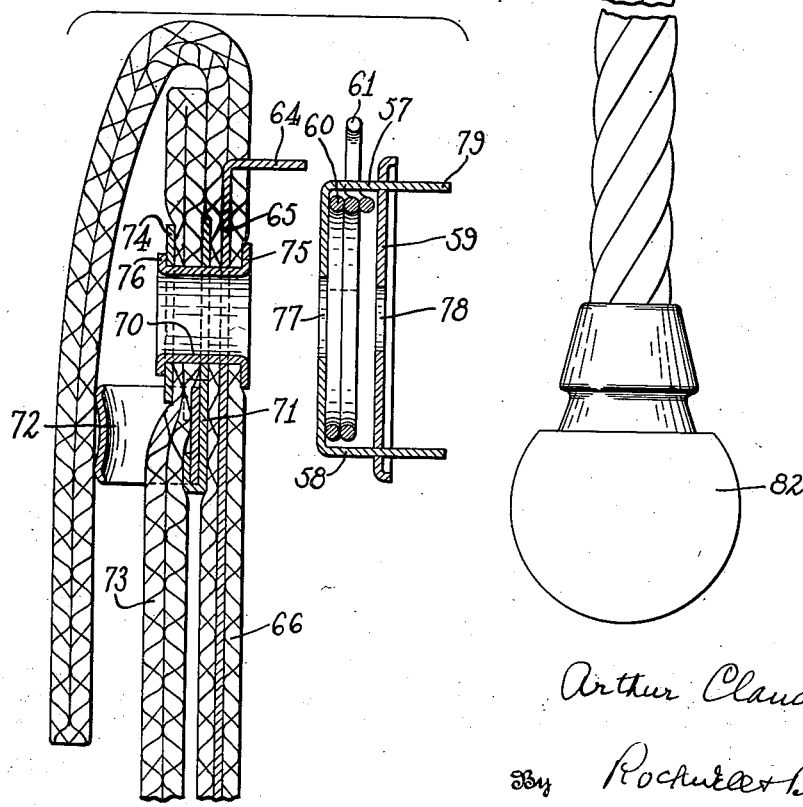

Patented Nov. 4, 1941

2,261,395

UNITED STATES PATENT OFFICE 2,261,395

ASSIST CORD ASSEMBLY

Arthur Claud-Mantle, Trumbull, Conn., assignor to The Bassick Company, Bridgeport, Conn., a corporation of Connecticut Application March 27, 1939, Serial No. 264,308

26 Claims. (Cl. 105—354)

In the stream-lined car bodies now being used the upright members or mullions adjacent which the assist cords are located are arranged at an inclination to the vertical, the same being inclined upwardly and forwardly. Where an assist cord of the usual pendant type is used, a portion of it normally extends in a substantially vertical direction across a portion of the rear side window, which is objectionable because of the obscuring of the view, and the awkward or unsightly appearance of this portion of the car.

One of the objects of my invention is to overcome these drawbacks and to provide an assist cord assembly in which the body of the cord is normally held at an inclination so as to lie substantially in line with the mullions or division member immediately in front of the rear side window, although when the cord is in use it may hang in the customary pendant position.

Another object is to furnish an improved assist cord assembly in which a flexible cord body pendant from a fixture by which it is attached to the side of the car body, and which normally occupies a position at an angle to the vertical, is held in that position by a suitable spring or springs, which serve to return it to that position when, after use, it is released.

Another object is to provide an improved fixture or mounting for an assist cord.

To these and other ends the invention consists in the novel features and combinations of parts to be hereinafter described and claimed.

In the accompanying drawings:

Fig. 1 is a fragmentary inside elevational view of a car body showing an assist cord assembly embodying my improvements;

Fig. 2 shows on a larger scale and with portions broken away certain parts illustrated in Fig. 1;

Fig. 3 is a section on line 3—3 of Fig. 2 on a still larger scale;

Fig. 4 is a section on line 4—4 of Fig. 3;

Fig. 5 is a section on line 5—5 of Fig. 4;

Fig. 5A is a detail inner face view of a portion of the spring case;

Figs. 6 and 7 are details of the medallion clip;

Fig. 8 is a view similar to Fig. 4 showing the position of the springs when the cord member is swung out of its normal position;

Figs. 9, 10 and 11 are views corresponding to Figs. 3, 4 and 5, respectively, showing a somewhat modified form, Fig. 10 being a section on line 10—10 of Fig. 9, and Fig. 11 being a section on line 11—11 of Fig. 10;

Fig. 12 is a front elevational view of the upper portion of an assist cord assembly of still further modified form;

Fig. 13 is a rear elevation of the parts shown in Fig. 12;

Fig. 14 is a section on line 14—14 of Fig. 12;

Fig. 15 is an enlarged detail section on line 15—15 of Fig. 14;

Fig. 16 comprises showings of the cord member and spring case before assembly, illustrating on a larger scale certain parts shown in Fig. 14; and Figs. 17 and 18 are a rear view and a longitudinal section, respectively, of an assist cord assembly of still further modified form.

In Fig. 1 is shown a portion of the interior of a closed automobile body, where 20 is one of the rear side windows and 21 the mullion or division member which extends on an incline in a forward and upward direction. At 22 is indicated the assist cord assembly in general, and it will be observed that in this particular form, which is further illustrated in Figs. 2 to 8, inclusive, the cord member is constituted by a strap or web of textile material folded to form a loop, as customary in such devices. In the normal position of the device the assist loop is held by the means hereinafter described in the inclined position shown in full lines in Fig. 1, but when in use it is ordinarily shifted to a position such as that indicated by the dotted lines in the same figure.

Referring now to the details of the construction, it will be seen that the assembly comprises a case 23 forming a part of the attaching fixture, in which case is mounted a pin or bolt 24 forming a pivotal mounting for an assist loop 25, which may be made of the usual textile material. This loop 25 has a back flap 25', a front flap 26, and a top flap or tab 27, held in place by a medallion 28 supported from the pivot bolt 24 in the manner hereinafter described.

The spring case 23 in the particular form now being described is adapted to be located under the upholstery 29 on the side of the car body (Fig. 3), and is adapted to be welded directly to the meal wall 30 of the car body. Within the case 23 are flat springs 31, having their middle portions disposed at opposite sides of and in engagement with a flattened portion 32 on bolt 24. The springs 31 normally hold the bolt 24 and the assist loop, locked to it, in a predetermined position, which is the inclined position shown in full lines in Fig. 1. The terminals of the springs 31 are held in place by means including inwardly bent flanges or partitions 33 on the front wall of the case, and the springs are also positioned by inwardly bent ribs 34 on the front wall of the case.

The bolt 24 has a sharpened inner end 35 adapted to be thrust through the layer of cloth or upholstery when the assist loop and bolt are assembled with the spring case, and a cylindrical portion 36 on the bolt turns in a flanged opening in the metal wall of the car body. The flat portion 32 of the bolt is located between the cylindrical portion 36 and a similar cylindrical portion 37, turning in a round opening 38 in the front wall of the spring case, said opening having slots 39 extending therefrom so as to permit the introduction of the bolt 24 into the spring case. Outwardly of the cylindrical portion 37 the bolt is provided with a flange or collar 40, and extending forwardly and diametrically from the collar 40 is a flat head 41 on the bolt by means of which the assist loop is attached in the manner hereinafter described.

In order to impart a certain amount of stiffness to the assist loop in the plane of the strap or web material, so that on swinging the loop forwardly the bolt will be turned, the loop is suitably reinforced, and the reinforcement which I prefer consists of a spring steel backbone placed in the rear flap of the loop, said flap embedding and concealing the metal reinforcement. In the drawing the springy metal reinforce is shown at 42, and it will be noted that it preferably extends substantially throughout the length of the rear flap, and has a slot near its upper end fitted over the flat portion 41 of the bolt so that the bolt and flap are interlocked for turning together. Although the metal insert 42 stiffens the loop on one side in the plane of the web material, it does not materially stiffen the loop member in a plane perpendicular to said first-mentioned plane, or at any rate permits the loop to be readily opened in the customary manner for the introduction of a person's arm.

The rear flap or member of the loop is thrust over the head of the bolt so as to engage the rear flap with the collar 40, which acts to position the same. Next, a medallion clip 43, shown in detail in Figs. 6 and 7, is placed over the head of the bolt, with a slot 44 of the clip engaging the flat bolt head. The clip 43 has at opposite sides flanged ears or lugs 45, the flanges 46 and 47 of which are adapted to be clinched about a medallion or keeper 28 which is disposed below the bolt, and is in this instance provided with an upwardly disposed hook 49 acting as a coat hook or the like. The upper end portion of the front flap 26 is placed over the head of the bolt so as to lie in front of the medallion clip. A four-prong crown washer 50 is then placed over the head of the bolt, with the prongs engaging in the fabric of the front flap, and with the key-like head of the bolt engaging a slot 51 in said washer. At the extremity of the bolt head are small lugs 52, which extend through the slot in the washer and are clinched over to hold the front and rear flaps of the loop firmly in place. The tab portion 27 of the loop is held in place by being passed downwardly back of the medallion 28.

From the foregoing it will be understood how the assist loop is normally held in the inclined position shown in Fig. 1. It will also be apparent that upon grasping the assist loop and swinging it to the position shown in dotted lines in Fig. 1, the stiffened loop member interlocked with the bolt head will turn the bolt against the action of the springs 31, between which the flat portion 32 of the bolt is confined. Swinging of the loop member to the dotted line position of Fig. 1 will move the bolt and the springs 31 to the position shown in Fig. 8. Upon release of the assist loop, the springs 31 will immediately return the same to the normal inclined position.

As will be seen from the foregoing description, the spring mechanism is quite simple and inexpensive. The case thereof is open at the rear and can be readily positioned on the metal supporting wall and attached thereto by a simple operation such as spot welding. By reason of the fact that the spring case has an extended marginal portion 23ª lying flatwise against the supporting wall and projecting from the case mainly at the ends thereof, spot welding can be accomplished very conveniently, but of course I do not limit myself to this method of attachment. In this form the spring case will be entirely concealed beneath the upholstery or textile lining. The assist loop can be quickly and conveniently assembled with respect to the bolt or pin so as to lock it thereto, and the loop, with its protruding bolt, can then be very readily assembled with respect to the spring case, it being merely necessary to thrust the sharp-ended bolt through the upholstery, and to insert the rear end portion of the bolt into the case in the relation shown. It will be noted that the coat hook on the medallion is suspended from the bolt so as to be below the pivoting point, and with this arrangement the downward pull of the garment or other object supported on the hook has no tendency to pull the loop mounting or fixture away from its supporting wall, as has been the case in prior constructions where a hook was fixed on the upper part of the attaching plate for the assist loop.

The form of device shown in Figs. 9, 10 and 11 differs from that previously described mainly in the character of the spring case. Here the spring case 53 is intended to be placed over rather than under the upholstery, and hence is given the requisite ornamental finish. In this case the case is attached to the supporting wall 54 by two screws 55. It is not so important to provide the bolt with a sharpened inner end, but I have illustrated it as having a sharpened end 35, and, in fact, the bolt 24 is identical with that previously described. The springs 31ª are similar to the springs 31 previously described, but are positioned somewhat differently in that their extremities engage positioning lugs 56 at the respective corners of the case.

In the form shown in Figs. 12 to 16, inclusive, the form of the assist loop and its general system of mounting are similar to those previously described, but in this instance a volute spring is employed, and the same is contained in a round case. The spring case is shown at 57, and it is made up of a cylindrical body 58 and a rear plate 59. The volute spring is shown at 60, and the same is a double-acting spring having its two extremities 61 bent up and extended outside of the case through slots 62, said bent-up ends being spaced from each other by a portion 63 of the case wall at the upper part of the case. Between the bent-up spring ends 61 extends a lug 64 integral with the spring metal insert 65 at the upper end of said insert. The lug 64 is bent up at right angles to the body of the insert and protrudes from the rear flap 66 of the assist loop so as to extend rearwardly between the ends of the spring.

In this form, also, the loop is mounted on a bolt, and the bolt or fastener extends into the spring case, but it does not rotate therein. The bolt is indicated at 67, and it will be seen that it has a threaded extremity 68 adapted to engage a threaded opening (not shown) in the supporting wall, while the forward end of the bolt serves as a pivot or swivel mounting for the loop structure. At the outer end of the bolt the same is provided with an enlargement or head 69. Between the head 69 and the front wall of the spring case and surrounding the bolt is a ferrule or grommet 70 by means of which the assist loop structure is swingingly mounted on the bolt. Surrounding the grommet 70 is a portion of the metal insert 65, which is suitably apertured at that point. Surrounding the grommet in front of the back flap of the loop is the medallion clip 71, which has clinched thereto at its lower part the medallion 72. The front flap 73 is in front of the medallion clip, and in front of the front flap and surrounding the ferrule is a washer 74. The front and rear flaps are held together by the grommet 70, which has a flange 75 at the rear end and a flange 76 at the front end. The flange 76 is bent up last in order to clinch the grommet in the flaps, after which the bolt is inserted through the grommet and then through the spring case. The spring case has front and rear openings 77 and 78 to receive the bolt.

This form of device is intended to be applied outside of the body upholstery or lining. The main portion 58 of the spring case is provided with tongues 79 passing through openings in the base plate 59. Tongues 79 are provided at the side with steps 79ª which are deformed by a chisel or like tool in order to hold plate 59 to body 58. The tongues 79 are used as anchors to prevent rotary movement of the case. The car body has holes (not shown) to receive these tongues. The bolt or fastener holds the assist member against the spring case and thus holds the latter against the wall.

The operation of this form of the device will be obvious for the most part from the foregoing description. The metal insert, as before, forms a stiffener for the rear member of the loop, and as the loop is swung out of the normal inclined position, the bent-up end of the insert will act on one end of the spring in order to place the same under compression. When the assist loop has been released by the hand, the spring will restore it to the initial position. In these operations the grommet 70 will turn on the outer end portion of the bolt.

It will be noted that as a double-acting spring is employed, the spring will be compressed by the swinging of the assist cord from its normal position in either of two directions. When an assist cord is mounted in the manner shown in Fig. 1, it is not of particular importance that it be capable of swinging rearwardly as well as forwardly, but it will be understood that it is of importance that the assist cord be applicable either to the right-hand side of a car body or to the left-hand side thereof, without any adjustments being necessary. This is permitted by my improved construction, in which the assist cord is free to swing in either direction from an intermediate or median position, and of course this applies to the forms previously described, as well as the form shown in Figs. 12 to 16, inclusive.

Figs. 17 and 18 show a still further modified form of assist cord which is intended for mounting in an inclined position in the general relation shown in Fig. 1. In this form the body of the assist cord is constituted by a member which is, strictly speaking, a cord or rope, and the spring which returns the body to the normal inclined position is located within the cord or rope. In the drawings the rope-like body is indicated at 80, the same being formed of helically wound strands of textile material. This body is attached to the car body by a mounting or fixture 81. At the free end of the rope body is a knob 82 or other suitable member adapted to be grasped by the hand. Extending through the body 80 throughout the greater part of its length is a relatively stiff spring 83 formed as a helix of metal wire. Around the upper part of the rope body is a metal ferrule 84 tightly clinched on the body and having a through opening 85 for a long attaching screw 86 that passes through the rope as well as the ferrule, and into a threaded socket of the supporting wall (not shown). At the extreme upper end of the ferrule the same is provided on its inner side (Fig. 18) with a small extension or lug 87, through which a short screw 88 extends for securing the ferrule to the supporting wall at another point. The ferrule is enclosed and concealed by an ornamental sheath or case 89 having an open squared-off back 90 placed against the supporting wall. The case 89 is provided at its rear portion with lugs 91, which, when the case is slipped into place over the upper end portion of the rope member, engage behind ears 92 on the lug 87 for the purpose of holding the case or sheath in place.

The coil spring 83 should be sufficiently strong and stiff to prevent any substantial drooping of the cord body when the latter is in the normal inclined position behind the inclined mullion or stile of the car body. It will be apparent that in use the cord body will hang down straight, and that after the same is released it will spring back to the normal inclined position. It will also be understood that the cord body can be pulled in an inward direction as well as in a forwardly or rearwardly direction, and that upon release it will be restored to its initial position.

By my improvements the disadvantages incident to the use of the ordinary types of assist cords in car bodies having inclined mullions are effectively overcome. The several forms of assist cord herein described are relatively inexpensive, and can be readily manufactured and installed, and they provide a valuable control for the assist cord, whereby the latter is normally held in a predetermined preferred location.

While I have shown and described several forms of the invention, it will be understood that I have not attempted to describe all of the many forms the invention may take. Various changes in the details can be made without departing from the principles of my invention and the scope of the claims.

What I claim is:

1. In an assist cord assembly, a flexible assist web mounted to swing in its plane relatively to a pivot and stiffened in its plane, and a spring acting on the web in the plane thereof and normally holding it in a predetermined angular relation with respect to its support.

2. In an assist cord assembly, a flexible loop having inner and outer flaps, the inner flap being stiffened in the plane thereof, a pivot for the loop adjacent the upper end thereof, and spring means acting on the loop in the plane in which it is stiffened and normally holding the loop in a predetermined angular position.

3. In an assist cord assembly, the combination of an assist loop member, a bolt serving as a pivotal mounting therefor, said loop member being stiffened in the plane in which it is adapted to swing, a case into which the bolt extends, and spring means in the case acting on the loop member in the plane in which it is adapted to swing.

4. In an assist cord assembly, the combination of an assist loop member, a bolt serving as a pivotal mounting therefor, said loop member being stiffened in the plane in which it is adapted to swing, a case into which the bolt extends, and spring means in the case acting on the loop member in the plane in which it is adapted to swing, said spring means resisting movement of the loop when the latter is swung in either of two directions.

5. In an assist cord assembly, the combination of an assist loop member, a bolt serving as a pivotal mounting therefor, said loop member being stiffened in the plane in which it is adapted to swing, a case into which the bolt extends, and spring means in the case acting on the loop member in the plane in which it is adapted to swing, said spring means resisting movement of the loop when the latter is swung in either of two directions, and said spring means acting directly on the bolt.

6. In an assist cord assembly, a pivot bolt, an assist loop member swingingly mounted by said bolt in pendant position, a resilient backbone embedded in the inner flap of the loop member and stiffening it in the plane in which it is mounted to swing, a case adapted to be attached to a supporting wall and into which said bolt extends, and spring mechanism in the case acting on the loop member in the plane in which it swings for holding it in a predetermined angular position relatively to the wall on which the loop member is supported.

7. In an assist cord assembly, a pivot bolt, an assist loop member swingingly mounted by said bolt in pendant position, a resilient backbone embedded in the inner flap of the loop member and stiffening it in the plane in which it is mounted to swing, a case adapted to be attached to a supporting wall and into which said bolt extends, and spring mechanism in the case acting on the loop member in the plane in which it swings for holding it in a predetermined angular position relatively to the wall on which the loop member is supported, said spring mechanism acting directly on said pivot bolt.

8. In an assist cord assembly, the combination of a pivot bolt, an assist loop member having inner and outer flaps swingingly mounted by means of said bolt and also having a tab end, a medallion clip interposed between the inner and outer flaps and surrounding the bolt, means clinching the inner and outer flaps together, and a medallion loop attached to the medallion clip and constituting a keeper receiving said tab end.

9. In an assist cord assembly, an assist loop member having inner and outer flaps, a bolt extending through the flaps adjacent their upper ends, a medallion clip surrounding the bolt and located between the flaps, a medallion having an upwardly extending hook attached to the medallion clip below the bolt, and a mounting for the bolt.

10. In an assist cord assembly, an assist loop member having front and rear flaps, a bolt pivoting said flaps, a case into which said bolt extends, a volute spring in said case, and a metallic backbone in the rear flap of the loop member having a protruding end engaging a portion of the spring.

11. In a device such as described, a suspended assist loop of flexible strap material having inner and outer flaps, means somewhat stiffening one of said flaps in the plane thereof, and yielding means acting on said last-named flap in the plane thereof and in proximity to the suspended end of the loop for holding the loop in a predetermined angular position.

12. In an assist cord assembly, an assist loop member, an attaching bolt for securing the same to a wall, a metal fixture having a medallion clip supported on the bolt within the loop, and a medallion below the medallion clip extending over the outer side of the loop and having an upwardly projecting hook.

13. In combination with a car body having a forwardly and upwardly inclined mullion at the front margin of the rear side window, an assist member in the form of a strap of flexible material depending from the car body wall and having a free lower end, the plane of the strap being substantially parallel to the side wall of the car body, said strap having internal means reinforcing it in said plane, and means acting on said member adjacent its point of suspension and normally holding the same in an inclined position behind the mullion so as to be substantially concealed behind the mullion.

14. In combination with a car body having a forwardly and upwardly inclined mullion at the front margin of the rear side window, an assist member in the form of a loop depending from the car body wall and having a free lower end, said assist member comprising inner and outer flaps of flexible material movable in their respective planes, means reinforcing at least one of said flaps in the plane thereof, and means acting on said last-named flap in the plane thereof and adjacent the suspension point for yieldingly holding said assist member in concealed position behind the inclined mullion.

15. In an assist cord assembly, the combination of an assist member in the form of a loop of strap material having approximately parallel portions facing each other, a bolt serving as a pivotal mounting for said member adjacent the upper end thereof and providing for the swinging movement of the side portions of the member in the respective planes in which their strap material is disposed, at least one of said side portions being stiffened by a flat interior stiffening member disposed in the plane of swing, a case into which the bolt extends adapted for mounting on the side of the car body, and spring means in the case acting on the loop member to hold it normally in a predetermined position in its plane of swing.

16. In an assist cord assembly, the combination of an assist member in the form of a loop of strap material having approximately parallel portions facing each other, a fastener member having a shank serving as a pivotal mounting for said loop member adjacent the upper end thereof and providing for the swinging movement of the side portions of the member in the respective planes in which their strap material is disposed, said loop member being provided with a grommet embracing said fastener member, a spring at the rear of the loop member adapted to swing the loop member in either of two directions, and a member swingable with the loop member and having a portion surrounding and held in place by the grommet and another portion extending into cooperation with said spring.

17. In an assist cord assembly, the combination of an assist member in the form of a loop of strap material having approximately parallel portions facing each other, a fastener member having a shank serving as a pivotal mounting for said loop member adjacent the upper end thereof and providing for the swinging movement of the side portions of the member in the respective planes in which their strap material is disposed, said loop member being provided with a grommet embracing said fastener member, a spring at the rear of the loop member adapted to swing the loop member in either of two directions, and a member swingable with the loop member and having a portion surrounding and held in place by the grommet and another portion extending into cooperation with said spring, said other portion being constituted by a lug, and said spring having end portions between which said lug is disposed.

18. In an assist cord assembly, the combination of an assist member in the form of a loop of strap material having approximately parallel portions facing each other, a pivot member serving as a pivotal mounting for said loop member adjacent the upper end thereof, said pivot member being mounted to turn relatively to the wall of the car body, an interior reinforce for the loop member non-rotatively engaged with the pivot member and extending on opposite sides of the latter, and a spring acting on the pivot member and normally holding it in a predetermined angular position.

19. In an assist cord assembly, the combination of an assist member in the form of a loop of strap material having approximately parallel portions facing each other, a fastener member having a shank serving as a pivotal mounting for said loop member adjacent the upper end thereof and providing for the swinging movement of the side portions of the member in the respective planes in which their strap material is disposed, said loop member having a grommet carried thereby engaging said shank, a case into which said fastener member extends arranged at the rear of said loop member, a coil spring in said case having its extremities in proximity to each other, and a member swingable with and by the loop member extending around the grommet and having a rearwardly extending portion disposed between the extremities of said spring.

20. As an article of manufacture, an assist loop of flexible strap material having normally limber and pliable inner and outer flaps or side portions, and means disposed in one of said side portions somewhat stiffening the same in the plane of the strap material and rendering said side portion stiffer than the other although permitting the loop to be expanded sufficiently to receive a person's arm.

21. In an assist cord assembly, an assist loop member formed of a strap bent in a curve, a fastener pivoting said loop member adjacent the upper end of the latter to swing in a plane parallel to a wall in which the fastener is inserted, a medallion clip surrounding the fastener and located between the side portions of the loop member, and a medallion extending over the outer side of the loop member below the fastener and attached to the medallion clip.

22. In an assist cord assembly, an assist loop member having inner and outer flaps, a bolt extending through the flaps adjacent their upper ends and pivoting said loop member to swing parallel to a wall into which said bolt is inserted, and means including a double-acting spring located behind the loop member adjacent the bolt and acting on the loop member in an angular direction to return it to a predetermined angular position after it has been swung in either of two directions.

23. In an assist cord assembly, an assist loop member of strap material having inner and outer side portions located adjacent a supporting wall, a bolt by which said loop member is pivoted to the wall to swing parallel thereto, a case behind said loop member adjacent said bolt held in position against the wall by said bolt, and a double-acting spring in said case acting on said loop member in the plane of the strap material to urge it in an angular direction to a predetermined position.

24. In an assist cord assembly, an assist loop member formed of a strap bent in a curve, a fastener pivoting said loop member adjacent the upper end of the latter to swing in a plane parallel to a wall in which the fastener is inserted, a medallion clip engaging and supported from the fastener and located between the side portions of the loop member and having a medallion or trim portion extending over the outer side of the loop member below the fastener, and a spring acting on the loop member to hold it in a predetermined angular position.

25. In an assist cord assembly, an assist member, a pivot member serving as a pivotal mounting for said assist member adjacent the upper end thereof, a spring extending about said pivot member and arranged in approximately circular form with ends adjacent and opposing each other, means mounting said spring and holding said ends apart in opposition to the spring action, and a swinging member connected to the assist member to swing therewith and having a lug between the spring ends adapted to exert energizing pressure on one or the other.

26. In a device such as described, an assist member, a pivot member serving as a pivotal mounting for said assist member adjacent the upper end thereof, a spring to hold the assist member normally in a predetermined angular position, a casing extending about the pivot member, said casing enclosing and serving as a mounting for said spring and also as a tensioning means for said spring, and means operably associating said assist member with said spring to permit movement thereof from said predetermined angular position against the action of said spring in either of two directions.

ARTHUR CLAUD-MANTLE.